(12) United States Patent
Rogers

(10) Patent No.: US 6,584,915 B1
(45) Date of Patent: *Jul. 1, 2003

(54) JOINT STRUCTURE

(75) Inventor: Christopher John Rogers, Glen Waverley (AU)

(73) Assignee: Pryda PTY LTD, Victoria (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 623 days.

(21) Appl. No.: 08/989,891

(22) Filed: Dec. 12, 1997

(30) Foreign Application Priority Data

Feb. 20, 1997 (AU) .......................... PO 5182

(51) Int. Cl.$^7$ ............................... B65D 19/12
(52) U.S. Cl. .................. 108/56.1; 108/51.11; 411/283
(58) Field of Search .................. 108/51.11, 56.1; 411/283, 457, 458, 459, 461

(56) References Cited

U.S. PATENT DOCUMENTS

| 253,423 | A | * | 2/1882 | Pitkin | |
|---|---|---|---|---|---|
| 2,101,001 | A | * | 11/1937 | Balduf | |
| 3,454,292 | A | * | 7/1969 | Sanford | 403/283 |
| 3,591,997 | A | * | 7/1971 | Tennison, Jr. | 52/718.02 |
| 3,985,459 | A | | 10/1976 | Gilb | |
| 4,270,330 | A | | 6/1981 | Townsend | |
| 4,292,899 | A | * | 10/1981 | Steffen | 108/51.11 |
| 4,299,511 | A | * | 11/1981 | Demers | 403/283 |
| 5,071,280 | A | * | 12/1991 | Turner | 403/283 |
| 5,487,343 | A | * | 1/1996 | Phillips | 108/56.1 X |
| 5,673,629 | A | * | 10/1997 | Ginnow | 108/56.1 X |

FOREIGN PATENT DOCUMENTS

| NZ | 152704 | 4/1971 |
|---|---|---|
| NZ | 202308 | 11/1982 |

OTHER PUBLICATIONS

Simpson Strong–Tie Connectors, "Wood Construction Connectors", Catalog C–96, Jan. 1996.*

* cited by examiner

*Primary Examiner*—Jose V. Chen
(74) *Attorney, Agent, or Firm*—McDermott, Will & Emery

(57) ABSTRACT

A joint structure including a nail plate having an imperforate central region and being provided between two bearer components, and a plurality of nails adapted to extend through a first of the components, the imperforate region of the nail plate, and into the other of the components. The joint structure further provides a pallet having at least two laterally spaced bearers, and a plurality of laterally extending support boards extending over and being secured to an upper surface of each bearer. The pallet may also include a base having a plurality of laterally extending base boards extending under and being secured to a lower surface of each bearer. The support boards and base boards are in the form of elongated boards and, while successive support boards can abut, they preferably are slightly spaced apart. The pallet is strengthened by a joint structure located between at least one bearer and a lateral end board, by provision of a nail plate therebetween or within the bearer and by nails driven through the end board and the nail plate, into the bearer. The end board is a support board or a base board that extends at ends or sides of the pallet.

22 Claims, 4 Drawing Sheets

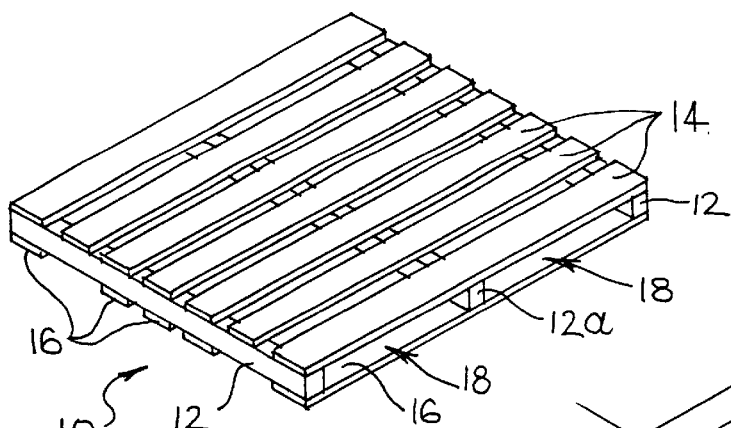
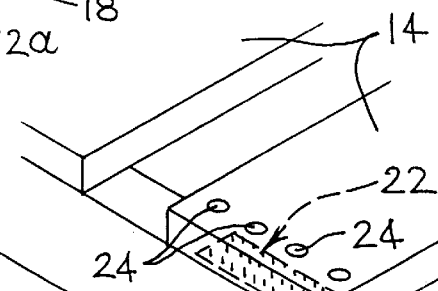
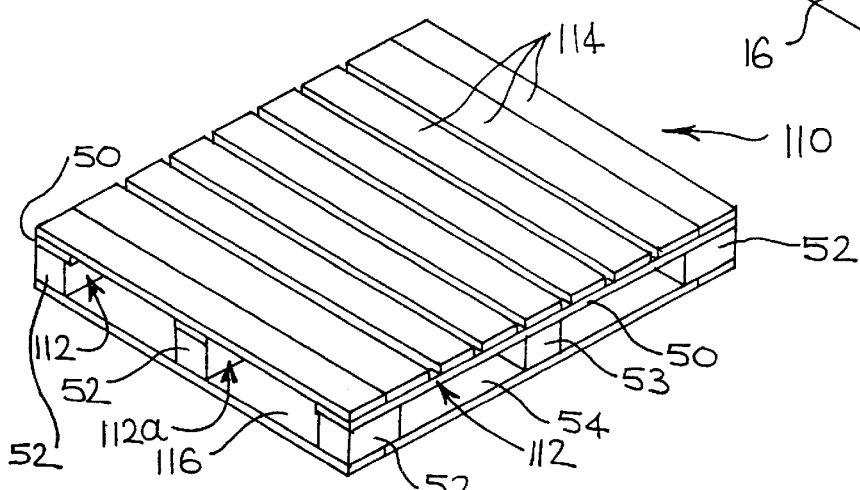
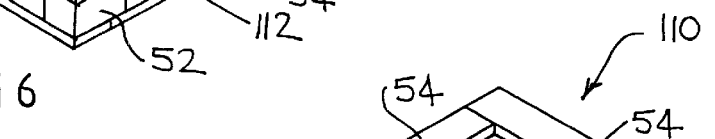
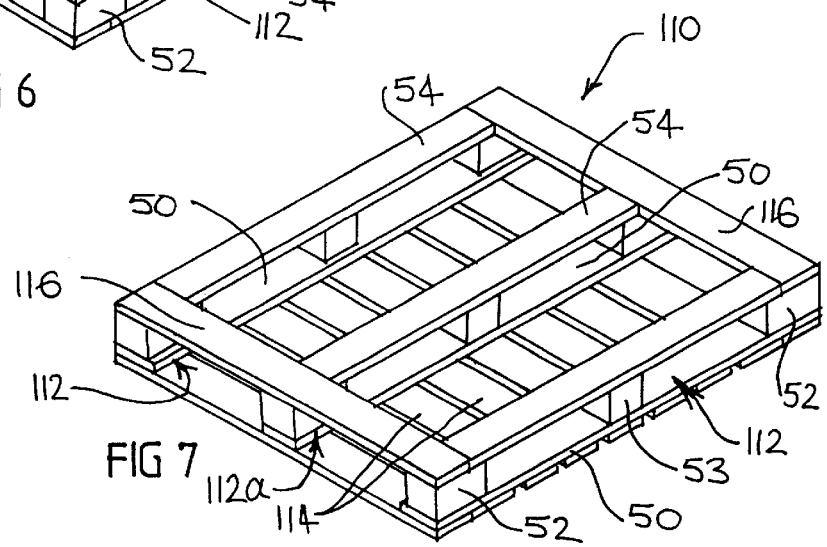

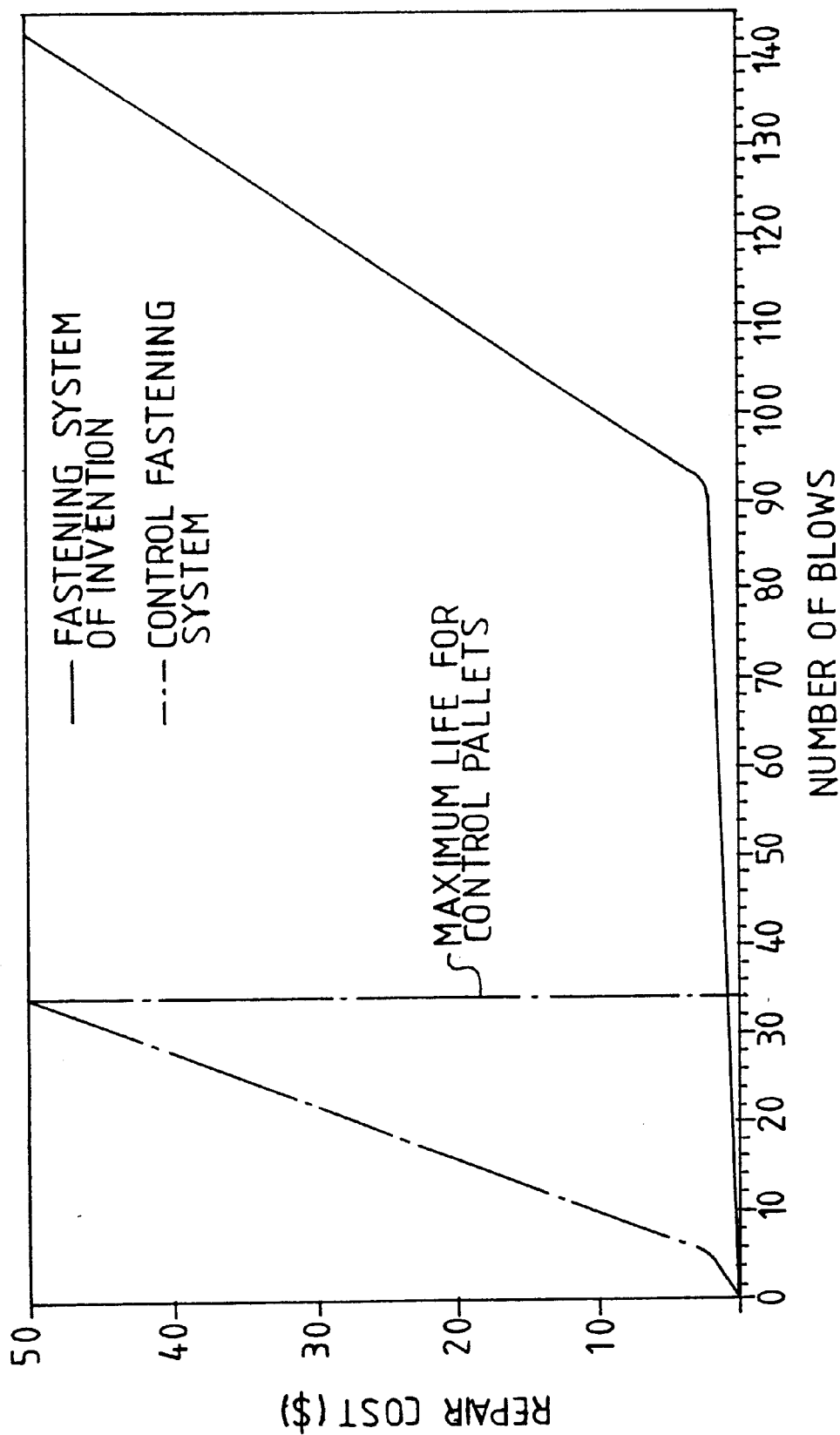

JOINT STRUCTURE

FIELD OF THE INVENTION

This invention relates to an improved joint structure formed between components of which one is timber and which are secured by nail fasteners.

BACKGROUND OF THE INVENTION

The invention, to be distinguished in our product range by the designation "Blue Fastening System", has particular application to pallets, and is illustrated by that application. However, it is to be appreciated that the invention has application in joints other than those in pallets. The invention is concerned with providing a joint which is strengthened against forces acting parallel to a surface of each of the components at a join therebetween i.e. forces which place nails securing the joint in shear.

A well known type of timber pallet is of rectangular form in plan view and has a top, load supporting surface defined by a plurality of laterally extending, load support boards. The boards are secured in assembly by being nailed to laterally spaced side bearers each of which extends at right angles to and below a respective end of each board. Usually there is also an intermediate bearer to which the boards are nailed. The pallet can stand on the bearers but, more usually, a base is secured to the bearers.

In one form of pallet of that known type, herein referred to as "a bearer pallet", each of the bearers (including an intermediate bearer if provided) is in the form of an elongate beam which may be of substantially uniform cross-section or which may be notched. In such case the base usually comprises a plurality of laterally extending base boards, which may be similar to the support boards and which are nailed to each bearer. In another form of pallet of the known type, herein referred to as a "block pallet", each of the bearers includes an elongate bearer plate and at least a respective bearer block below each end of the bearer plate, with the support plates nailed to the bearer plates and blocks. Usually there is an intermediate bearer block for each bearer plate. In the case of a block pallet, the base usually comprises a respective longitudinal base board below, and nailed to, the blocks of each side bearer plate and a lateral base board below and nailed to a respective block of each bearer plate.

With both bearer and block pallets, the pallet, and a load thereon, is able to be lifted by the tines of a fork lift device inserted into a cavity or a respective cavity defined between the side bearers, below the load support boards and, if provided, above the base. Damage to pallets is a relatively frequent occurrence, due to repeated impacts of the support or base boards by the tines in lifting the pallet, more specifically by the uprights from which the tines extend. Damage usually is to an end support board or a transverse end base board extending across the ends of the bearers, with damage being more frequent for end support boards than for end base boards by a factor of about 2 to 1. However, base boards also can be damaged by being dragged on hard surfaces such as concrete, while dragging can dislodge base boards.

Damage to the end support or base board necessitates pallets frequently needing to be taken out of service for repair. Eventually, the cumulative effect of damage and repair results in the need for a pallet to be discarded. Both repair, and replacement of a discarded pallet, represents a substantial cost factor. The damage frequently results from or involves movement of the end board relative to its bearers with a significant component parallel to the interface between the end board and bearers. This causes bending of the nails, to a somewhat S-shape which causes bruising of surrounding timber. Also, the bending tends to align the nails with the forces generating the movement, facilitating withdrawal of the nails from the end board or the bearers.

SUMMARY OF THE INVENTION

The present invention is concerned with providing an improved joint structure. In one preferred form, there is provided a pallet which has joints according to the invention and which, while not entirely eliminating the above cost factors, enables them to be reduced substantially. The pallet of the invention can be of the bearer form or of the block form.

A joint according to the invention is provided between two components of which at least one is of timber. The joint includes a nail plate provided between the components, and nails driven through one component and the nail plate, into the other component.

Each component may be of timber. Alternatively, one may be of timber and the other of another suitable material, such as a suitable grade of plastics material or light gauge steel plate. The components may comprise an end board and a bearer of a pallet, and reference to an end board and a bearer in the following description and claims is to be understood as illustrative of other components between which a joint according to the invention may be formed.

A pallet according to the invention has at least two laterally spaced bearers, and a plurality of laterally extending support boards extending over and secured to an upper surface of each bearer. The pallet also may include a base and, where this is the case, the base may include a plurality of laterally extending base boards extending under and secured to a lower surface of each bearer. As in the known forms of pallet, the support and, where provided, the base boards are in the form of elongate boards and, while successive support boards can abut, they usually are slightly spaced. However, a pallet according to the invention is strengthened, at a joint between at least one bearer and a lateral end board, by provision of a nail plate therebetween or within the bearer and by nails driven through the end board and nail plate, into the bearer. The end board is a support board or a base board which extends at ends or sides of the pallet.

Preferably a respective nail plate is provided between the lateral end board and each side bearer, to strengthen the pallet at each of two corners between which the end board extends. Where there is an intermediate bearer, a further nail plate can be provided between it and the lateral end board. The pallet can be further strengthened by a respective nail plate being provided between an end support board and the upper surface of each of the bearers, and between a base board and the lower surface of each of the bearers. In each case, the arrangement can be arranged at one end of the pallet or at each of its ends.

In the case of a bearer pallet, the nail plate of a join is provided between the end board and bearer. The same applies in the case of a block pallet where the end board is a base board, with the nail plate provided between the base board and a bearer block. However, where the end board is a support board of a block pallet, the or a respective nail plate of a join may be between the support board and the bearer plate of the bearer, and/or between the bearer plate and a block of the bearer.

In a joint according to the invention, the nail plate is substantially fixed relative to the one of the components of the joint in which the nail plate teeth are embedded. The portion of nails of the joint within the one component is substantially constrained against bending. Thus, with forces tending to cause relative movement between the components, parallel to the nail plate, bending of the nails is possible substantially only in the portion of each which is within the other component. As that portion of each nail is short relative to the overall nail length, the nails are substantially more resistant to bending under the action of a given force than would be the case if that force acted on the nails over their full length in the absence of a nail plate.

It is preferred that a respective nail plate be provided between each end board and each bearer. However, where a respective nail plate is to be provided between only one end board and each bearer, the end board preferably is a support board in the case of a bearer pallet and a base board in the case of a block pallet.

The nail plates, as will be appreciated, are formed from steel sheet metal from which a plurality of projecting teeth are punched, such as those available under the trade mark CLAW NAIL. The projecting teeth enable the plate to be applied to a surface of a timber member, or to surfaces of contiguous timber members, by being driven, by hand, hydraulically or pneumatically, to embed the teeth fully into the timber member or members. All teeth of a nail plate can extend in a common direction, from a main surface of the sheet metal, as is preferred for use in the present invention, or the nail plate can have teeth projecting from each of opposite main surfaces of the sheet metal.

The each nail plate preferably has an area which corresponds to a major part, most preferably substantially all, of the interface between the components of its joint, such as between a lateral board and bearer in a pallet joint. An interface area may, for example, be 150 mm×50 mm, and a suitable nail plate can have an area providing about 75% coverage of the interface area. That is the nail plate can be about 130 mm×45 mm. The nail plate can be from about 0.6 mm to 1.2 mm thick, such as from 0.8 to 1.0 mm thick.

A nail plate frequently has a uniform array of teeth over its surface area. However, those for use with the present invention preferably have at least one region from which teeth are not punched, to enable nails to be driven through clean metal of the nail plates. Such region preferably is centrally located, such as along a medial line, as appropriate for nails driven through an end board into a bearer of a pallet.

The tooth density of the nail plate, excluding such region from which teeth are not punched, may be from 0.8 to 1.5 teeth/cm². The teeth preferably are of coined or twisted variety, most preferably with a respective tooth at each end of each of a plurality of slots formed on punching the teeth. The tooth length may be in the range of 8 to 13 mm, and preferably is 9 to 10 mm for hardwoods and 10 to 12 mm for use with softwoods.

In a pallet according to the present invention, each nail plate most preferably is applied to the upper or lower surface of a bearer, so that its teeth are embedded in the bearer. This is a most highly preferred arrangement. However, in a second possible arrangement, each nail plate can have teeth projecting from each of its main surfaces and be applied between the surface of a bearer and the adjacent surface of an end board, so that respective teeth are embedded in the bearer and the end board. In the second arrangement, the nail plate preferably has shorter teeth embedded in the end board and longer teeth embedded in the bearer. In a third arrangement, each nail plate is applied to and has its teeth embedded in a surface of an end board which is opposed to a bearer. In a further arrangement, in which the end board is a support board of a block pallet, the nail plate may be between the bearer plate and a block of a bearer, with its teeth embedded in either the bearer plate or the block, or with teeth of respective sets embedded in each of the bearer plate and block. However, not all of these arrangements may be available since a choice between them assumes that the bearers and also the end plates are of timber, as is preferred.

A pallet according to the invention need not be entirely of timber. Thus, while the support and base boards may be of timber, the bearers may be of a suitable plastics material or of light gauge steel. Alternatively, it is possible but less desirable for the bearers to be of timber and the support and/or base boards of plastics or light gauge steel. In these forms, each nail plate is able to have teeth projecting from only one of its major surfaces, with these being directed so as to become embedded in the timber component.

The spacing of the nails applied in each join can be closer than without the use of nail plates. Also, penetration of nails into a bearer and block may be approximately 10 times the nail diameter. The nails preferably are staggered. The width of the nails may be about three to four times the thickness of the plate from which the nail plates are formed. The nails may be driven by hand, hydraulically or pneumatically, with the upper limit for nail width being more appropriate where the nails are driven by hand or hydraulically rather than pneumatically.

Suitable nails can have a diamond point, a blunt diamond point or a blunt point. A diamond point is preferred as it penetrates the nail plate more satisfactorily. At least a majority of the nails most preferably pass through the nail plate predominantly, if not entirely, through clean metal of each nail plate, such as within a region from which teeth are not punched. Also, each nail preferably has its centre at two to three times the nail diameter from an edge of the nail plate, whether this be a peripheral edge or an edge of a slot from which teeth of the nail plate are punched.

The nails used to secure a joint according to the invention can take a variety of forms. In most forms, the nails in at least some longitudinal cross-sections include gripping means characterised by a longitudinal series of formations each of which tapers outwardly in a direction from its leading end to its head, such that the formations enable penetration, but act to resist withdrawal. The formations may be provided over substantially the full shank length of the nail. However, a portion of the shank length adjacent to the head of the nail may be free of the formations, with that portion having a length less than the thickness of the component, such as an end board, into which the nail is driven first.

The formations may be asymmetric in longitudinal section. Thus, each formation may have a shoulder which faces towards the head of the nail and which is at a greater angle to the shank than a surface providing the outward taper. The shoulder may be at an angle of up to about 90° to the shank, or even in excess of 90° so as to be re-entrant.

The formations evident in a longitudinal cross-section of the nails preferably are circumferentially continuous. In such case, they are of annular form and may be produced by rolling. Annular formations are preferred and contrary to expectations, are found to work well with hardwood components. However, the formations need not be circumferentially continuous. In the latter case, the formations may be in annular bands, such as would result from providing longitudinal grooves along the shank of a nail having annular or helical formations. However, the formations can be of a form resulting from other procedures in which they are upset from the shank of a suitable nail.

The provisions of a respective nail plate at corner joints between which an end board extends, and at intermediate joints at intermediate bearers, provides for substantial strengthening of the joints and hence, resistance of the pallet to damage. As a consequence, the average frequency with which a pallet needs to be taken out of service, such as for replacement of an end board, can be substantially reduced. That is, the average time between successive repair intervals for a pallet can be substantially increased. In each case, the improvement is relative to pallets of the known form which do not have nail plates and gripping means as required by the invention.

The maximum benefit is obtained with pallets according to a preferred arrangement, having nail plates with teeth embedded only in the upper and/or lower surface of the bearers, and the end boards secured by nails having annular formations applied through the end boards and nail plates so as to extend into the bearers. In comparative testing between such pallets and pallets of the known form, up to a ten-fold increase in the average time between the need for repair of the pallets was obtainable with pallets according to the invention, relative to the average time required for the known pallets. However, substantial benefits also are obtained with pallets having a respective set of teeth embedded in each of a bearer and end board, or with teeth embedded only in an end board.

In the comparative testing, samples of the two types of pallets were subjected to repeated blows simulating impact by the tines of a lifting device such as experience in normal use. The pallets according to the preferred arrangement of the invention were found to have greatly enhanced corner joint strength and impact resistance for their end boards, due to the joints restricting the tendency for blows against the end boards to develop a detrimental level of vertical force components in the nails. This is attributed to the nails operating substantially in shear, due to their interaction with the nail plates. The nails are found to provide a tight fit between their gripping means and the nail plates, achieved by the nails bursting through the nail plates as they are applied to form holes through the nail plate somewhat ballistically. At least during initial impacts, the gripping means are set against the edge of holes of the nail plates to achieve a positive lock therebetween.

The positive locking is best achieved by nails having gripping means comprising a longitudinal series of continuous annular formations of longitudinally asymmetric form. However, improved results can be achieved with nails having gripping means comprising discontinuous annular arrays of formations of longitudinally asymmetric form and to a lesser extent, nails having gripping means comprising discontinuous helical arrays of formations of longitudinally asymmetric form. Improved results also can be achieved with nails having gripping means comprising continuous helical thread of longitudinally asymmetric form, but this form generally is less desirable than the others and, in particular, is less desirable than gripping means of continuous annular formations.

In each case, the reference to asymmetric form denotes the form in longitudinally section. The formations, in such section, have respective shoulders facing towards and away from the head of the nail, with the shoulder acing the head being at a greater angle to the axis of the nail than the other shoulder. In each case, the positive locking provided by a formation is achieved by its shoulder facing the head.

The improved joints achieved in pallets according to the invention result from the combined action of the nail plates and nails having suitable gripping means. The use of nail plates with conventional nails, having a substantially uniform shank cross-section, provides lesser improvement over use of such nails without the nail plates. The use of nails with suitable gripping means, but without use of nail plates, also provides little improvement. In each case, impacts generate force components tending to cause withdrawal of the nails and failure of the joint. With use of conventional nails with nail plates, holes punched in the latter during application of the nails provide less resistance to withdrawal. With nails having gripping means, but used without nail plates, the initial response of the nails to impact is to bruise surrounding timber and to align themselves with force components tending to cause their withdrawal, with ultimate withdrawal of the nails and failure of the joint.

When a pallet according to the invention does necessitate repair, the nature of the repair can vary with the extent of damage. In some instances, it can be sufficient simply to clamp or press an end board back into position and drive in a sufficient number of further nails with gripping means. Where the damage is more extensive, an end board may need to be replaced, generally with forced withdrawal or cutting of the nails for that board, and positioning a new end board and securing this by fresh nails having gripping means.

BRIEF DESCRIPTION OF THE DRAWINGS

In order that the invention may more readily be understood, reference now is directed to accompanying drawings, in which FIG. 1 is a perspective view of a bearer pallet of a general type to which the invention relates;

FIG. 2 shows a corner of a bearer pallet, on an enlarged scale relative to FIG. 1 showing a corner joint for a pallet according to the invention;

FIG. 4 is a graphical representation of results of comparative testing of bearer pallets according to the invention and bearer pallets of a known form of pallet;

FIG. 6 is similar to FIG. 1, but shows a block pallet of a general type to which the invention relates;

FIG. 7 shows the pallet of FIG. 6 in a perspective view from the underside; and

DETAILED DESCRIPTION OF THE INVENTION

Figure 3:
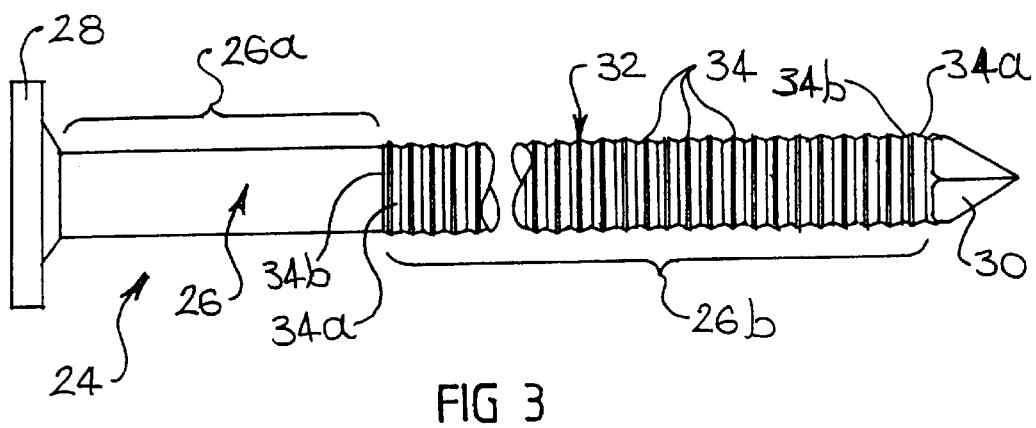
FIG. 3 shows a nail suitable for use in the corner joint of FIG. 2.

In FIG. 1, the pallet 10 shown has laterally spaced, side timber bearers 12 and an intermediate timber bearer 12a therebetween. Across bearers 12 and 12a, pallet 10 has a plurality of relatively narrow, laterally disposed timber support boards 14, while a lesser number of similar lateral basal boards 16 provide a base. The pallet 10 is secured in assembly by boards 14 and 16 being nailed to the bearers 12 and 12a. A load on pallet 10 is able to be lifted by the tines of a fork lift device being inserted into openings 18 between each side of bearer 12a and a respective bearer 12.

In a pallet 10 of known form, conventional nails are driven through the boards 14 and 16, into the bearers 12 and 12a to secure the assembly. In the case of a pallet 10 in accordance with the present invention, at least one of the end most boards 14 is secured to each bearer 12 in the manner illustrated in FIG. 2. However, the pallet 10 according to the invention may, and preferably has, each end board 14 secured to each bearer 12 as shown in FIG. 2, and to bearer 12a; while each end board may be secured to bearer 12a in a similar manner. Thus, this pallet according to the invention has six, but may have twelve, nail plates 22.

The corner 20 shown in FIG. 2 has similar components to those of pallet 10 of FIG. 1, and these therefore have the same reference numeral. However, as shown in FIG. 2, an end board 14 is not applied directly to the upper surface of a bearer 12 and then nailed in position. Rather, a nail plate 22 first is applied to that surface of bearer 12, such that its teeth are embedded in bearer 12. The end board 14 then is positioned over the nail plate 22 and secured by driving nails 24 through board 14, nail plate 22 and into bearer 12. The nail plate shown in FIG. 2, is intended to have a construction substantially the same as that shown in FIG. 5, which is discussed in detail later herein, so as to have a central or median region which is imperforate. A suitable form for nails 24 is shown in FIG. 3.

The nail 24 shown in FIG. 3 is produced from hard drawn nail wire, such as of grade WC1017 or equivalent and having a tensile strength such as of about 800 to 910 MPa. Nail 24 has a shank 26 extending from a head 28 to terminate at a diamond point 30, with point 30 tapering to an included angle of, for example, 45° to 48°. From head 28, shank 26 has a portion 26a of smooth, uniform cross-section and of a length not exceeding the thickness of an end board 14. Portion 26a may have a diameter of about 3.1 mm. Between portion 26a and head 30, shank 26 has a portion 26b on which gripping means 32 are formed. The means 32 comprise a plurality of axially spaced annular rings 34 which may have an external diameter of about 3.2 mm.

Each ring 34 is of asymmetric form in longitudinal diametrical cross-sections, with successive rings 34 spaced from each other by a narrow land 36 therebetween. Rings 34 preferably are roll formed on a uniform shank section, with metal rolled from zones to form lands 36 contributing to the rings 34.

As can be seen in FIG. 3, each ring 34 is asymmetric as a result of respective oppositely facing annular shoulders 34a and 34b. The shoulder 34a of each ring 34 faces towards point 30 and flares frusto-conically outwardly towards head 28. Shoulder 34b faces towards head 28, and flares frusto-conically outwardly towards point 30, or extends substantially radially, and is at a greater angle to the axis of shank 26 than shoulder 34a.

As nails 30 are driven through a support board 14 and nail plate 22, into a bearer 12, such as with a hydraulic gun, it bursts through nail plate 22 to form a hole in the latter. The asymmetric form of rings 34 facilitates penetration of nail plate 22, but resists withdrawal of nail 24. Also, nail plate 22 is securely held in position, by its teeth being embedded in bearer 12. With forces acting to withdraw nail 24 from the resultant corner joint, the shoulder 34b of a ring 34 is engaged by the periphery of the hole formed through nail plate 22, providing very substantial resistance to the forces. In this regard, it seems that the periphery of the hole, after penetration of the nail plate 22 by the nail 24, recovers inwardly to provide strong engagement around nail 24.

A further nail plate preferably is applied to the end faces of at least each side bearer 12, such as depicted at 38, while similar nail plates can be provided at each end face of intermediate bearer 12a. The nail plates 38 can simply be applied without use of nails, with their teeth being embedded in the end-grain of the bearers 12 (12a) to protect the bearers against splitting, such as from repeated nailing or impacts.

Two sets of pallets 10 of two forms have been subjected to testing. The first set of pallets were control pallets as in FIG. 1, with the support boards 14 secured to the bearers 12, 12a by conventional nails and without provision of nail plates. The second set of pallets were the same except that they had corners in accordance with FIG. 2, using nail plates and nails as in FIG. 3.

The two sets of pallets were subjected to repeated impacts simulating those experienced in use with tines of a fork lift device. The impacts were applied to an end board 14 so as to act to generate a substantial force component in the nails retaining the end board in a direction for withdrawal of the nails. Where pallets were damaged to an extent which, in use, would necessitate repair, they were repaired and then subjected to further testing.

FIG. 4 illustrates the performance of the two sets of pallets, providing a plot of number of impact blows versus the cost of repair. The left hand plot shows results for the control pallets of the first set, while the right hand plot shows results for the pallets of the second set and in accordance with the present invention.

As shown by FIG. 4, there is a very major improvement in the service life of pallets in accordance with the invention. The results are averaged for the pallets of each set. Some variability was evidence in each set, but particularly in the case of the pallets of the invention, this was attributed to variability in the timber used. The pallets of the invention show in excess of a four fold increase in maximum life of end boards compared to the control pallets, taken as when those repair costs aggregate to $50.00. However, to the level of nominal repair costs of $10.00, the pallets of the invention show a ten-fold improvement, with further repair costs thereafter increasing more slowly than for the control pallets.

Figure 5:
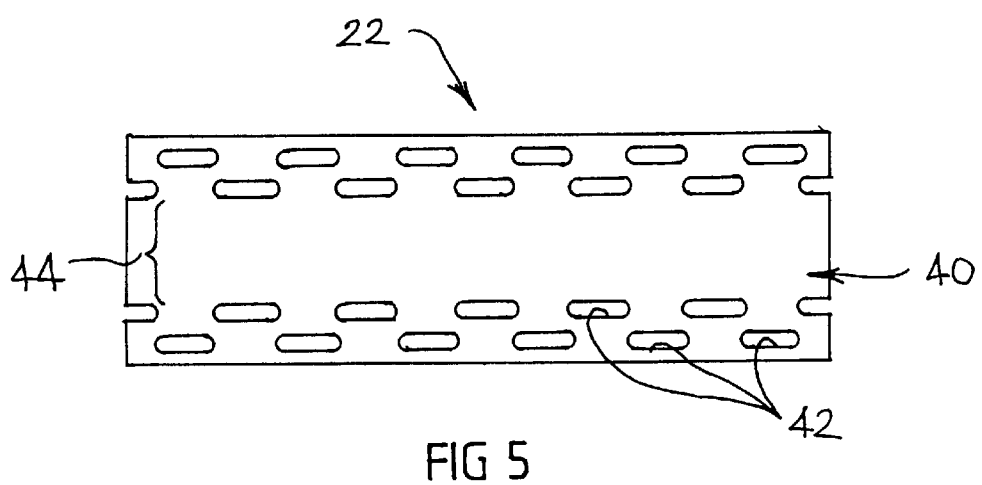
FIG. 5 shows one form of nail plate for use in pallets according to the invention.

In FIG. 2, the nail plate 22 is shown schematically, although a preferred form is shown in FIG. 5. The nail plate 22 of FIG. 5 is shown as viewed at one major surface 40, with its teeth (not shown) projecting at right angles away from the other major surface. Respective pairs of teeth are punched from steel sheet from which nail plate 22 is formed so as to leave slots 42, with a tooth of each pair being at each end of the respective slot 42. However, while not evident in FIG. 2, the slots 42 and their teeth are grouped in two bands to leave a central or median region 44 from which teeth are not punched. The nails 24 are driven through nail plate 22, preferably entirely through clean metal of region 44, intermediate the two bands of slots 42 and their teeth.

The pallet 110 shown in FIGS. 6 and 7 has laterally spaced side timber bearers 112 and an intermediate bearer 112a. Each bearer 112, 112a comprises a longitudinal bearer plate 50, a respective bearer block 52 secured under each end of each plate 50 and an intermediate bearer block 53 secured under a central region of plate 50.

The pallet 110 further includes a plurality of laterally disposed timber support boards 114 extending across the bearers 112, 112a. Also, a timber base of pallet 110 is provided by transverse basal end boards 116 extending below a respective block 52 of each bearer 112, 112a and a respective longitudinal base board 54 below each bearer 112, 112a. The width of each end board 116 is less than the corresponding extent of the blocks 52 such that each end of each base board 54 also is below a respective block 52.

In a pallet 110 of known form, conventional nails are driven through plates 50 into blocks 52 and 53. Also, such nails are driven through boards 114 into plates 50 and, if required in the case of relevant boards 114, into blocks 52, 53. Additionally, further conventional nails are driven through end boards 116 into blocks 52, and through base boards 54 into respective blocks 52, 53. However, in a pallet 110 according to the invention, a suitable nail plate 122 is used in each joint at an end board 114 and a bearer 112, 112a and/or in each joint at an end board 116 and a bearer 112, 112a, such as in an arrangement shown or described with reference to any one of FIGS. 8 to 10.

Figure 8:
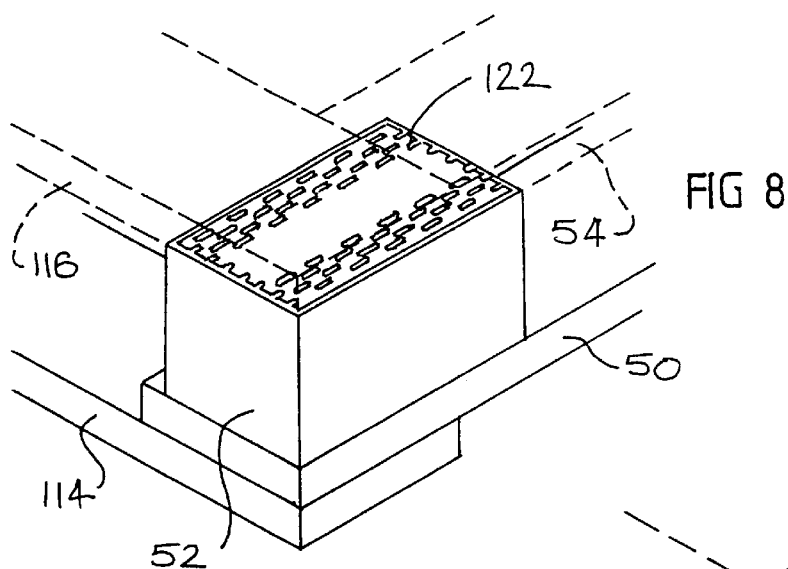
FIGS. 8 to 10 show alternative corner joints according to the invention for a pallet as in FIG. 6 but in the orientation of FIG. 7.

In the corner of a pallet 110 shown in FIG. 8, a nail plate 122 is shown as applied to the lower surface of block 52, with its teeth embedded in block 52. Nails (not shown), such as shown in FIG. 3, are applied through each of basal end board 116 and base board 54, through nail plate 122, into block 52. As shown, nail plate 122 has an area end shape substantially corresponding to the lower surface of block 52, enabling this form of attachment for each of boards 116 and 54. However, in the alternative arrangement of FIG. 9, the nail plate 122 has an area and shape, and is positioned, so as to enable such attachment only for board 116, with board 54 being secured to block 52 by conventional nails. In a further alternative, partially shown in FIG. 10, board 116 may extend over a nail plate (not shown) as in FIG. 9, with a smaller nail plate 122a being provided for securement of board 54. This latter arrangement enables one or each of the nail plates 122, 122a to be in the inverse orientation, with the teeth of plate 122 embedded in board 116 and/or the teeth of plate 122a embedded in board 54. In FIG. 10, the overall style, if not detail of the nail plate 122a, is similar to that of FIG. 5, in that it includes an imperforate longitudinal band extending centrally of the nail plate, and while this is not readily apparent from the illustration of FIG. 10, it should be understood as having that construction.

Figure 9:
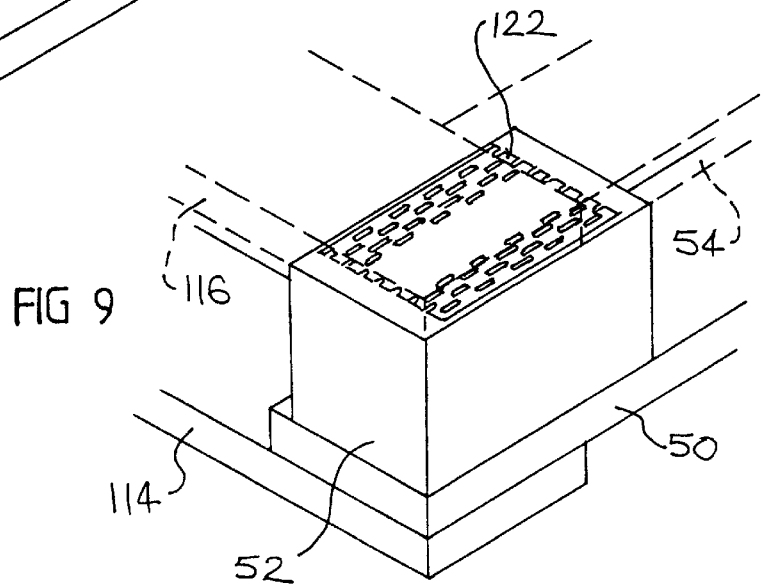
Figure 10:
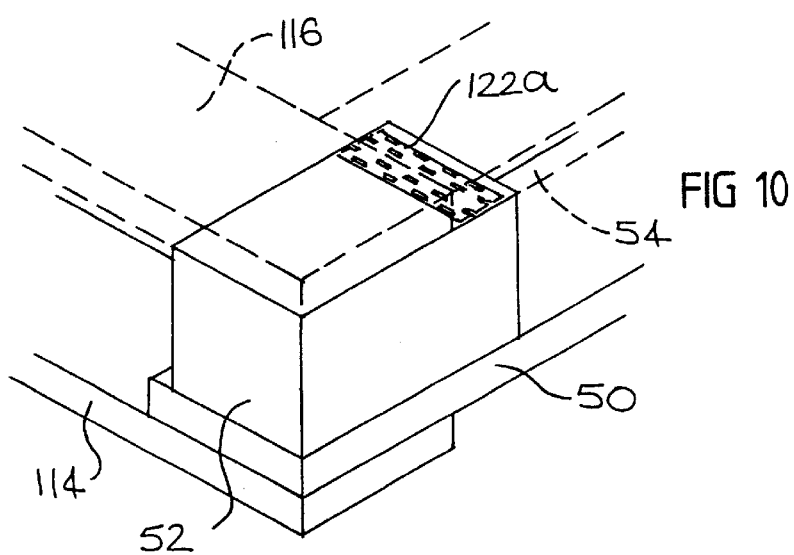

None of FIGS. 8 to 10 show a further nail plate above block 52. In this regard, it will be appreciated that the joins of FIGS. 8 to 10 are shown from below (that is, in the orientation of the underside perspective view of FIG. 7). However, a further nail plate above block 52, for securing end support board 114, readily can be visualised from the detail of FIGS. 8 to 10. The further nail plate can be similar to that shown in FIG. 9, and be positioned between the top surface of block 52 and the opposed surface of plate 50, or between the top surface of plate 50 and the underside of end support board 116. In the former case, the further nail plate can have its teeth embedded in either of the opposed surface or a respective set of teeth embedded in each of those surfaces. Similarly, in the latter case, the further nail plate can have its teeth embedded in plate 50 or board 116, or a respective set of teeth embedded in each of plate 50 and board 116.

Like FIG. 2, each of FIGS. 8 to 10 show a corner joint. However, a similar arrangement is possible for the intermediate bearer 12a of FIG. 1 and its end boards 14 and/or 16, and for intermediate bearer 112a of FIG. 6 and its end boards 114 and/or 116.

Each of the illustrated embodiments shown, include a longitudinally extending central imperforate zone through which the nails are driven. In an alternative construction, that zone could be oriented transversely to the longitudinal direction, or in another direction as may be appropriate. Thus, the central imperforate zone may be of any suitable shape and orientation.

Finally, it is to be understood that various alterations, modifications and/or additions may be introduced into the constructions and arrangements of parts previously described without departing from the spirit or ambit of the invention.

The claims defining the invention are as follows:

1. A joint between two components one of which is a timber component, said joint comprising:
    a single nail plate having an imperforate central region and being sandwiched between said components; and
    a plurality of nails driven through a first of the components, said imperforate region of said nail plate, and into the other of the components.

2. A joint according to claim 1, in which each of said components is of timber.

3. A joint according to claim 1, in which one of said components is timber and the other of said components is a plastic material, or a light gauge steel plate.

4. A joint according to claim 1, wherein each of said components is imperforate in the region in which said nails are driven.

5. A pallet comprising:
    at least two laterally spaced elongate bearers;
    a plurality of laterally extending elongate support boards extending over and secured to an upper surface of each bearer;
    a joint between at least one of said bearers and a lateral end board of said plurality of support boards, said joint including a single nail plate sandwiched between said lateral end board and said bearer and a plurality of nails driven through said lateral end board, a central imperforate region of said nail plate and into said bearer.

6. A pallet according to claim 5, each said nail plate including a plurality of teeth projecting in a common direction from only one of its major surfaces, which are embedded in the upper or lower surface of the bearer.

7. A pallet according to claim 5, each said nail plate including a plurality of teeth projecting from each of its main surfaces, each said plate being applied between the surface of a bearer and the adjacent surface of an end board, so that said projecting teeth are embedded in both the bearer and the end board.

8. A pallet according to claim 5, said nails being of a form selected from a diamond point, a blunt diamond point or a blunt point.

9. A pallet according to claim 5, said nails in at least some longitudinal cross-sections having gripping means in the form of a longitudinal series of formations each of which tapers outwardly in a direction from its leading end to its head, such that the formations enable penetration but resist withdrawal.

10. A pallet according to claim 9, said formations extending over substantially the full shank length of said nails.

11. A pallet according to claim 10, in which a portion of the shank length adjacent the nail head is free of said formations, said portion having a length less than the thickness of the component into which the nail is driven.

12. A pallet according to claim 9 said formations being asymmetric in longitudinal section.

13. A pallet according to claim 9 said formations each having a shoulder which faces towards the nail head and which is at a greater angle to the shank than a surface providing the outward taper.

14. A pallet according to claim 9, said shoulder being at an angle of up to 90° to the shank or in excess of 90° to the shank so as to be re-entrant in the latter case.

15. A pallet according to claim 9, said formations being circumferentially continuous in longitudinal cross-section of the nail and being of annular form.

16. A pallet according to claim 9 said formations being discontinuous annular arrays of longitudinally asymmetric forms.

17. A pallet according to claim 9, said formations being continuous helical thread of longitudinally asymmetric form.

18. A pallet comprising:
   at least two laterally spaced elongate bearers;
   a plurality of laterally extending elongate support boards extending over and secured to an upper surface of each bearer;
   a base including a plurality of laterally extending elongate base boards extending under and secured to a lower surface of each bearer; and
   a joint including a single nail plate sandwiched between a lateral end support board and an upper surface of said bearer or between a base board and a lower surface of said bearer, and a plurality of nails driven through said lateral end board, a central imperforate region of said nail plate and into said bearer.

19. A pallet comprising:
   at least two laterally spaced bearers, said bearers including an elongate bearer plate and at least two bearer blocks below each said bearer plate;
   a plurality of laterally extending elongate support boards extending over and secured to an upper surface of said bearer plate; and
   a joint between at least one of said bearers and a lateral end board of said plurality of support boards, said joint including a single nail plate sandwiched between an upper surface of said bearer plate and a lower surface of a lateral end board or between a lower surface of said bearer plate and an upper surface of said bearer block, and a plurality of nails driven through said end board, a central imperforate region of said nail plate and into said bearer.

20. A pallet according to claim 19, each said nail plate including a plurality of teeth projecting in a common direction from only one of its major surfaces, said teeth being embedded in at least one of the pallet components selected from the bearer, the bearer plate, the end support board and the base board.

21. A pallet according to claim 19, each said nail plate including a plurality of teeth projecting from each of its main surfaces, said teeth being embedded in at least two of the pallet components selected from the bearer, the bearer plate, the end support board and the base board.

22. A pallet comprising:
   at least two laterally spaced bearers, said bearers including an elongate bearer plate and at least two bearer blocks below each said bearer plate;
   a plurality of laterally extending elongate support boards extending over and secured to an upper surface of said bearer plate;
   a base including a plurality of elongate base boards extending under and secured to a lower surface of said bearer blocks; and
a joint including a single nail plate sandwiched between an upper surface of said bearer plate and a lower surface of a lateral end board, or between a lower surface of said bearer plate and an upper surface of said bearer block, or between a lower surface of said bearer block and an upper surface of a base board secured to one of said bearer blocks, said joint including a plurality of nails driven through said end board, a central imperforate region of said nail plate and into said bearer.

* * * * *